March 29, 1932. H. B. DENMAN 1,851,087
BRAKE LINING
Filed Aug. 15, 1931
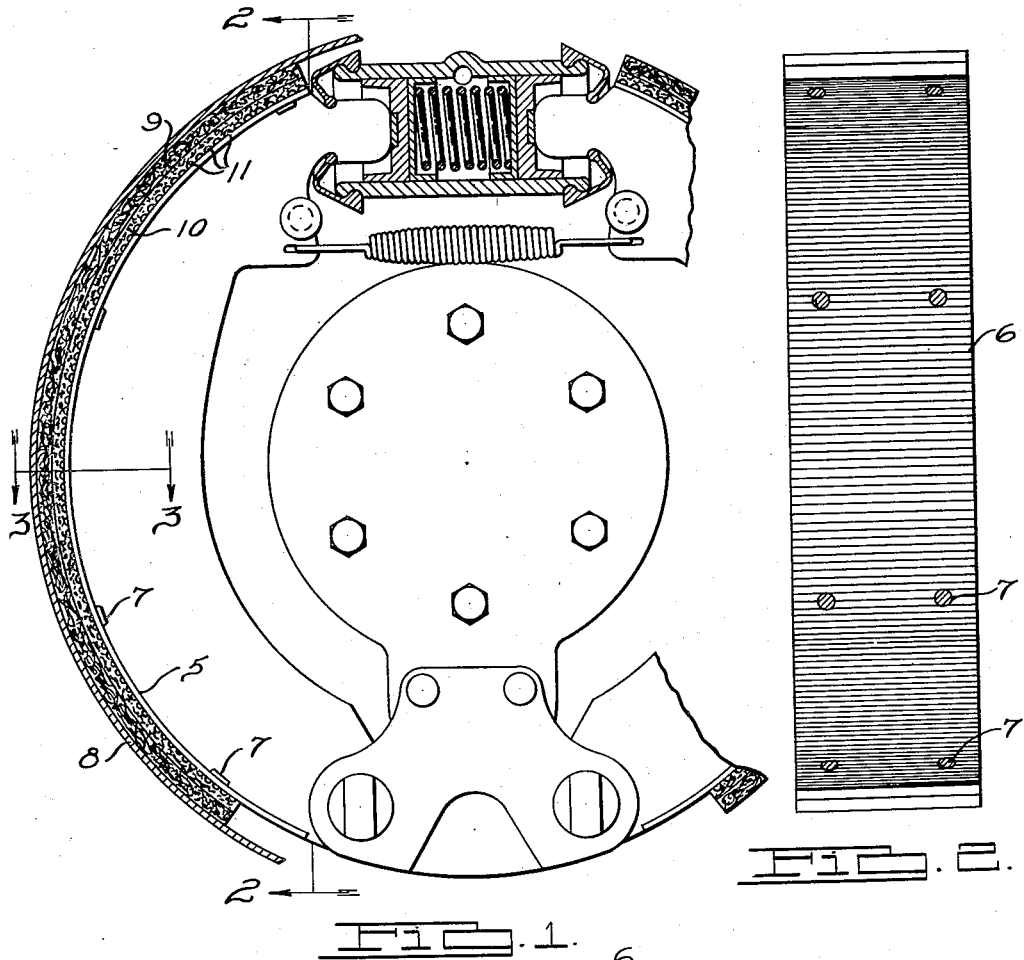
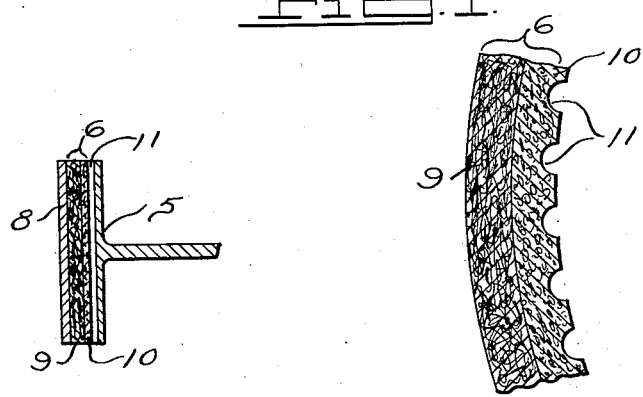
INVENTOR
Harry B. Denman.
BY
Harness, Dickey, Pierce & Hann,
ATTORNEYS.

Patented Mar. 29, 1932

1,851,087

UNITED STATES PATENT OFFICE

HARRY B. DENMAN, OF PONTIAC, MICHIGAN

BRAKE LINING

Application filed August 15, 1931. Serial No. 557,289.

This invention relates to brake linings.

The main objects of this invention are to provide an improved brake lining which will have a high degree of efficiency; to provide a brake lining which has a friction face with a high co-efficient of friction and a supporting back of great tensile strength; to provide a brake lining which will remain relatively cool by reason of rapid dissipation of heat; to provide a brake lining which will have a relatively long useful life; to provide a brake lining which is moldable so as to exactly conform to the supporting shoe upon which it is mounted; and to provide a brake lining having a face of one material, a supporting back of another material and both of said materials having rubber therein and being vulcanized into an integral unit.

An illustrative embodiment of this invention is shown in the accompanying drawings, in which—

Figure 1 is a view partly in elevation and partly in section of an internal expanding brake provided with my improved lining material.

Fig. 2 is a view in elevation of a segment of the brake lining viewed as indicated by the arrows 2—2 of Fig. 1 but not mounted on the supporting shoe.

Fig. 3 is a sectional view taken on the line 3—3 of Fig. 1 looking in the direction indicated.

Fig. 4 is an enlarged fragmentary sectional view taken longitudinally of a segment of the lining at right angles to the transverse grooves formed therein.

In the manufacture of brake linings of the character in which asbestos is mixed and molded with a suitable binder such as rubber, it has been found that in making the strip of brake material all of the same consistency and composition, it has been necessary to use relatively long fiber asbestos for the purpose of holding or binding the material together.

In the use of brake lining made of long fiber asbestos, it has been found that under certain conditions, such as when heated or when water gets into the brake drums, the lining has a tendency to and will coat or glaze over so that it has a very low co-efficient of friction. Automobile brakes equipped with these linings, when driven through the rain and water, often get out of control by reason of the inability of the operator to stop the car when the brake linings become glazed.

Excessive heat on this long fiber brake lining will cause the fibers to roll and bunch up so that when they have passed the glazed state wherein the braking efficiency is very low, the lining then will grip or grab the brake drum and this condition is practically as bad as the glazed condition.

I have found that all of these difficulties can be overcome by the use of a brake lining in which the friction face is composed of very short fiber or powder like asbestos. These improved linings will not only have a greater co-efficient of friction than the long fiber, when dry, but furthermore, when soaked in water or wet from driving through rain and water these linings will then be just as efficient, if not slightly more so, than when dry.

One difficulty, however, in making a brake lining of short fiber asbestos is in the manner of holding the lining together, the fibers being short, the lining will not be held together by these fibers as in the case of a long fiber asbestos. Therefore, I have overcome this difficulty by making a laminated lining in which about half the thickness of the lining on the friction face thereof is composed of material made principally from short fiber asbestos and the other half or the supporting back of the lining made of a rigid supporting material having relatively high tensile strength.

Both the face and back layers of the brake lining have rubber therein and the two layers are integrally joined by vulcanizing them together so as to form a unitary lining.

It is of course to be understood that the exact composition of the backing layer and face layer as disclosed by me do not constitute an essential part of my invention except that it is highly desirable that the face of contact portion of the brake band should be composed of certain reinforcing agents as herein disclosed. For purposes of my invention it is necessary merely that the backing layer be composed of strong and rigid composition such as hard rubber. Manifestly, there are an infinite number of such compositions known or possible and the selection of any particular one involves nothing more than the ordinary mechanical skill of the trained compounder.

An excellent face material for my improved brake lining may be described as follows: While it is not desired to be limited to any particular mesh size, for the finely divided material, in general it may be stated that the major friction constituent should pass through a 200 mesh sieve. The point, relative to mesh size, is that it should be so fine as to produce a substantially homogeneous friction composition which will not form small pits when in service. The present invention contemplates the use of such a friction constituent, together with a vulcanizable element such as rubber, or vulcanizable fatty residues.

While it is recognized that many finely divided friction materials may be used, and broadly the present invention resides in the use of such a material in combination with a vulcanizable element, it has been discovered that certain materials give particularly satisfactory results, and in the preferred form of the invention finely divided magnesium silicates are used. Instead of using the fibrous varieties of tremolite, actinolite or serpentine, according to the present invention, there is used finely divided magnesium silicates such as tremolite and actinolite. Tremolite and actinolite are calcium magnesium silicates, the actinolite having usually some iron present. Talc, which is a magnesium silicate, has also given satisfactory results when substituted for the finely divided magnesium silicates set forth, or when mixed therewith.

Particularly satisfactory friction facing compositions have been obtained when using as the finely divided material the product known as asbestine, which is understood to be prepared from rocks belonging to the tremolite or actinolite family of the non-fibrous variety.

In view of the above, the present invention may be said to comprise the provision of a friction facing material containing a vulcanizable material, a finely divided magnesium silicate together with a waterproofing agent. More specifically, the friction facing material contains rubber, vulcanizing agents, a finely divided friction producing material such as asbestine, talc or mixtures thereof, and waterproofing agents, usually resins and waxes.

Such a composition has a smooth braking surface of maximum braking area and a relatively high coefficient of friction when wet or dry. By varying the amount of resin, particularly rosin present, the coefficient of friction may be varied over quite a wide range. Further, by varying the percentages of finely divided material, such as asbestine, talc or mixtures thereof, and rosin, and wax, the coefficient of friction may be adjusted to any desired extent. The wax used in making the composition also facilitates the mixing thereof and serves as a waterproofing agent in the finished product. Various waxes such as mineral, hydrocarbon and vegetable waxes may be used, it not being desired to be limited to any particular wax. For example, there may be used ozokerite, beeswax, Montan wax, paraffine wax, or ceresin wax.

The friction composition mix prior to vulcanization has present a vulcanizing agent. This may include the ordinary inorganic vulcanizing compounds which usually contain sulphur or an organic accelerator may be used to decrease the time of vulcanization. Usually, there is also present compounds functioning as an activator for the particular vulcanizing agent or accelerator used. For example, zinc oxide may be used as an activator. Lime, magnesium oxide or mixtures of the same, also may be present in the mix to assist in the vulcanization, although neither is essential, as both may be omitted without greatly affecting the desirable characteristics of the finished product. Zinc oxide also, while desirable, is not absolutely necessary.

As an example of a suitable accelerator, diphenylguanidine may be used. However, it is obvious that other organic accelerators well known and on the market may be substituted for the diphenylguanidine.

The following is a specific example of a suitable mix:

A master batch is made from rubber, rosin and an accelerator. For example, the specific composition of the master batch may be:

|  | Parts by weight |
|---|---|
| Rubber | 100 |
| Rosin | 25 |
| Accelerator | 1¼ |

The amount of accelerator used may be varied, depending on the type of accelerator used and the length of cure desired.

A portion of the master batch is mixed with finely divided materials of the character set forth, and a suitable example is as follows:

|  | Parts by weight |
|---|---|
| Master batch (prepared as above set forth) | 25 |
| Non-fibrous asbestos (asbestine) | 85 |
| Lime | 3 |
| Zinc oxide | 1 |
| Sulphur | 7 |
| Wax | 1½ |

In making the complete mix, the following represents the preferred mode of procedure, and gives the most satisfactory results. However, the invention is not limited to the particular manner of mixing herein set forth.

The master batch is mixed separately, either in an internal type of mixer or in a standard mixing mill. The rubber is first broken down to run smoothly, after which the waterproofing agent, for example rosin, and the accelerator are added as rapidly as possible. The entire mass is thereafter mixed thoroughly until the rosin is entirely blended into the rubber. The batch is then sheeted out and allowed to cool.

The required amount of the master batch is placed on a mixing mill or in an internal mixer and warmed until it begins to run smoothly. Thereafter, the finely divided material such as the non-fibrous asbestos, for example asbestine, mixtures of asbestine and talc, or talc alone, together with a wax and suitable activators are added as rapidly as possible. In the specific example given, the activated material comprises lime and zinc oxide. The wax is preferably added during the early stages of the mixing to facilitate the blending of the mixed constituents. The sulphur is added towards the end of the mixing period and allowed to mix just long enough to become thoroughly blended in the batch. The batch is thereafter sheeted out and allowed to cool.

The complete batch is warmed in the customary manner and passed through a sheeting calendar to sheet it out to the required thickness and width. The sheeted material is then ready for vulcanization.

The following are further examples of representative variations, and show that the percentage constituents of the mix may be varied considerably and still come within the spirit of the present invention:

|  | No. 1 | No. 2 | No. 3 |
| --- | --- | --- | --- |
|  | Parts by weight | | |
| Rubber | 12 | 20 | 15 |
| Accelerator |  | 1 | .5 |
| Rosin | 5 | 5 | 2.5 |
| Asbestine | 70 | 65.25 | 65.5 |
| Lime | 5 | 1 | 2 |
| Magnesium oxide | 2 | 1.5 |  |
| Wax | 1 | 5 | 1.5 |
| Sulphur | 5 | 4.75 | 6 |
| Zinc oxide |  | 1 | 1 |

In the above examples, the major constituents of the mix are finely divided non-fibrous asbestos and rubber, the former being present in predominating quantity. Talc may be substituted wholly or in part for the finely divided non-fibrous rocks of the asbestos family.

The above representative mixes produce a friction composition, and particularly a brake lining material of a homogeneous character or nature. A cut or ground surface of the material will be perfectly smooth and free from any large particles, lumps or fibers. The product is particularly distinguishable for brakes containing asbestos by virtue of the absence of any fibrous material. When a composition containing fibers or asbestos is ground, it will present a fuzzy appearance, or small pits will show where fibers have been pulled away. When a composition is made as above set forth, and particularly when it contains asbestine, if it is treated in a similar manner, a smooth surface is obtained. Such a composition when used as a brake lining gives a smooth braking surface, assuring maximum contact area, which results in an increase in braking power.

It is desired to point out that the particular method of mixing the ingredients may be considerably varied. For example, instead of making a master batch and then compounding this with other ingredients, all the materials may be mixed in one operation. Any method of mixing consistent with good manufacturing practice may be used, and this will depend in a measure upon the type of equipment which a particular rubber manufacturer has available. However, the two-step method of mixing has given very satisfactory results.

It is to be understood that the particular examples set forth are merely illustrative of suitable mixes, and are not given by way of limitation. The percentage of finely divided non-fibrous asbestos, for example asbestine, may be considerably below 65% and still come within the spirit of the invention. It may be as low as 50% and, in some cases, depending on service conditions to be met, even lower.

In its broadest form the invention is directed to a friction facing composition containing the finely divided nonfibrous asbestos such as asbestine or mixtures containing asbestine and talc, or talc in place of the asbestine in combination with a vulcanizable material, particularly rubber. In its more specific aspect, the invention includes the above constituents in combination with a waterproofing agent, which by way of illustration may be rosin and/or wax, it being recognized that other waterproofing agents may be used in the composition as partial substitutes for the rosin and wax, or substituted entirely therefor. It is not desired to be limited to any specific percentage of the above ingredients, as this will depend greatly upon the coefficient of friction desired, and this may be varied by varying the proportion of rubber, finely divided material and a waterproofing agent.

The face sheet is vulcanized to a base material to form a friction facing surface. The base material may consist of another rubber compound, or a rubber and fabric combination, or fabric with and without reinforcement, or it may consist of a metal strip or metal shoe. In the preferred form of the invention, the braking element is made up of two distinct materials; a face material to function as a braking surface, and a base material to function as a support for the face material.

The following constitutes a specific formula of a relatively hard rigid backing material. However, these materials primarily are illustrative and it is to be understood that numerous other materials of similar physical characteristics may be substituted in lieu thereof.

*Backing material*

| | Pounds |
|---|---|
| Smoked sheet rubber | 25 |
| Sulphur | 12½ |
| Diphenyl guanidine | 1½ |
| Zinc | 5 |
| Lime | 5 |
| Whiting | 51 |

This compound is mixed and sheeted in the usual manner.

The backing layer and face layer are calendered together and vulcanized under conventional conditions.

For example, in carrying out the vulcanization the sheet of material may be placed between heated plates under pressure for a sufficient itme to allow vulcanization to occur. In the example given above, the material is vulcanized for twenty minutes at 315 degrees F. under a hydraulic line pressure of 2250 pounds per square inch. It is obvious that the time and temperature of vulcanization, as well as the hydraulic pressure, may be varied as desired. The degree of vulcanization may of course be varied to meet predetermined service conditions. In general, however, the vulcanization is carried to a point where the vulcanized face material will give a test reading of 98 to 100 degrees on a Shore durometer.

So long as the short fibered asbestos or asbestine and the rubber are retained the compositions may be altered in ways well known to skilled compounders without departure from the spirit of the invention.

Another difficulty which has been overcome is in the matter of the brake linings heating up during use. My rigid braking material is of such character that transverse grooves may be molded therein and then mounted upon a supporting brake shoe whereby air passageways are provided between the shoe and the lining. Due to the rigid characteristics of the backing material these grooves will be preserved and maintained throughout the life of the lining, whereas if they were formed in a relatively soft asbestos braking material they would soon flatten and smooth out.

By reason of these air passageways the heat will be quickly dissipated and the brake shoe and brake lining maintained in a relatively cool condition at all times, thereby materially lengthening the life of the brake lining and maintaining it in better working order at all times during such life than is the case with the ordinary type of lining.

In the construction shown in the drawings, a brake shoe member 5 is shown with a brake lining member 6 secured thereto by rivets 7 or the like, the outer ends of which are countersunk in the usual manner so as not to contact with the brake drum 8.

The brake lining is of laminated construction and comprises an outer or friction face layer 9 composed principally of short fiber asbestos composition such as previously described having a high coefficient of friction, and an inner or back layer 10 of rigid material having relatively high tensile strength which, however, is moldable when heated so as to be conformable to the brake shoe 5 upon which it is mounted.

Both the face layer 9 and the back layer 10 of the improved lining have rubber therein and the two layers are vulcanized together so as to form an integral unit.

The lining is preferably made in strips cut to suitable lengths for mounting on the brake shoes and formed into substantially arcuate shape.

The outer face of the back layer 10 is provided with a plurality of transversely extending grooves 11, semi-circular in cross section, which provide air passageways between the lining member 6 and supporting member 5 when the lining is mounted therein. The grooves 11, by reason of their shape and spacing and being formed in a rigid material, form a series of supporting arches which will remain present in the brake lining throughout its useful life.

In the manufacture of this lining the layers 9 and 10 are vulcanized together and the grooves 11 formed in the face of the back are formed by rolling or similar means. The lining is cut into suitable lengths for mounting on brake shoes and the backing material as well as the face material being moldable when heated, the strips are shaped to substantially the correct radius for the brake shoes upon which they are to be mounted. The transverse grooves 11, being of semi-circular cross section, aid in the curving of the strip of lining to the desired radius.

In the use of this lining the rigid backing material, by reason of its having great tensile strength and by reason of its being vulcanized to the face layer, will support and hold the face layer of short asbestos so that it is maintained in proper position to co-act with the brake drum. The short fiber asbestos has a very high coefficient of friction and will not readily grip when heated such as the long fiber asbestos. When heated to an extreme degree which would cause the long fiber asbestos to roll up and grab, the short fiber asbestos will not roll up and will not grab the brake drum.

The transverse grooves 11 in the backing material provide air passageways between the lining and supporting shoe and these air passageways materially help to dissipate the heat and maintain the lining as a whole in a relatively cool condition, thus materially lengthening the life of the brake lining and improving its efficiency during such life.

Water and the like will not impair the efficiency of the short fiber asbestos lining face as is the case with long fiber asbestos and it has been found by actual test that the coefficient of friction is slightly increased when wet, which is diametrically opposite to the long fiber asbestos.

Although only the preferred embodiments of the invention have been herein shown and described, it will be understood that numerous details of the construction shown may be altered or omitted without departing from the spirit of this invention as defined by the following claims.

I claim:

1. A friction element for a wheel brake, having a face layer containing as its essential ingredients an organic binder and an amphibole pigment, the last being substantially free from fibrous and filamentous bodies and a reinforcing backing layer.

2. A friction element for a wheel brake, having a face layer containing as its essential ingredients an organic binder and a reinforcing agent consisting of a calcium magnesium silicate interspersed therein, the mass being substantially free from fibrous and filamentous bodies and a reinforcing backing layer of rubber bonded thereto.

3. A friction element for a wheel brake, comprising a face layer having as its essential ingredients rubber as a binder and pigment comprising calcium-magnesium silicate interspersed therein, the mass being substantially free from fibrous and filamentous bodies and a backing layer of rubber bonded thereto.

4. A friction element for wheel brakes comprising a face layer having as essential ingredients vulcanized rubber and at least 50% of finely divided pigment incorporated therein, the mass being substantially free from fibrous and filamentous bodies and having a reinforcing layer vulcanized thereto.

5. A friction element for a wheel brake comprising a body consisting of, as essential ingredients, an organic binder and a crystaline calcium magnesium silicate pigment interspersed therein, the body being substantially free from fibrous and filamentous substances and having a backing layer of reinforcing material bonded thereto.

6. A friction element for a wheel brake, having a face layer comprising as essential ingredients an organic binder and at least 50% crystalline nonhydrous amphibole in finely divided form, the mass being substantially free from fibrous and filamentous bodies, and a supporting layer of reinforcing rubber vulcanized thereto.

7. A friction element for a wheel brake, having a face layer comprising as essential ingredients vulcanized rubber intermixed with finely divided calcium magnesium silicate, the mass being substantially free from fibrous and filamentous bodies, and a reinforcing layer of rubber composition bonded thereto.

8. A friction element for a wheel brake, having a face layer comprising as essential ingredients vulcanized rubber intermixed with a crystalline calcium-magnesium silicate in finely divided form, the mass being free from fibrous and filamentous bodies, and a reinforcing layer of hard rubber bonded thereto.

9. A friction element for a wheel brake, having a face layer comprising as essential ingredients rubber in vulcanized state and finely divided non-fibrous amphibole, the mass being substantially free from fibrous and filamentous bodies, and a reinforcing layer of hard rubber bonded thereto.

10. A friction element for a wheel brake, having a face layer comprising as essential ingredients vulcanized rubber, finely divided non-fibrous amphibole from a class comprising actinolite, tremolite and talc, rosin and paraffin in such proportions as to provide a desired coefficient of friction, the mass being substantially free from fibrous and filamentous bodies, and having a strong, rigid reinforcing layer vulcanized thereto.

11. A friction element for a wheel brake, having a facing layer comprising as essential ingredients a body of vulcanized rubber in which is interspersed at least 50% of non-fibrous material from a class comprising actinolite, tremolite and talc, sufficient rosin and wax to provide the desired coefficient of friction, and having a strong rigid backing vulcanized thereto.

12. A friction element for wheel brakes, having a face layer comprising as essential components rubber and finely divided non-fibrous pigment intermixed therewith, the element being vulcanized upon a brake shoe, and having a backing of strong, rigid rubber composition vulcanized thereto.

HARRY B. DENMAN.